US012585979B2

(12) United States Patent (10) Patent No.: US 12,585,979 B2
Mopur et al. (45) Date of Patent: Mar. 24, 2026

(54) MANAGING DATA DRIFT AND OUTLIERS FOR MACHINE LEARNING MODELS TRAINED FOR IMAGE CLASSIFICATION

(71) Applicant: Hewlett Packard Enterprise Development LP, Houston, TX (US)

(72) Inventors: Satish Kumar Mopur, Bangalore (IN); Sridhar Balachandriah, Bangalore (IN); Krishnaprasad Lingadahalli Shastry, Bangalore (IN); Maximilian Classen, Ratingen (DE); Milind B Desai, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 1034 days.

(21) Appl. No.: 17/237,537

(22) Filed: Apr. 22, 2021

(65) Prior Publication Data

US 2022/0215289 A1     Jul. 7, 2022

(30) Foreign Application Priority Data

Jan. 6, 2021     (IN) .............................. 202141000574

(51) Int. Cl.
  *G06N 20/00*          (2019.01)
  *G06F 18/22*          (2023.01)
      (Continued)
(52) U.S. Cl.
  CPC ............. *G06N 20/00* (2019.01); *G06F 18/22* (2023.01); *G06F 18/2321* (2023.01); *G06V 10/751* (2022.01)

(58) Field of Classification Search
  None
  See application file for complete search history.

(56) References Cited

U.S. PATENT DOCUMENTS

2012/0036175 A1*   2/2012   Tang .................. G01N 15/1429
                                                         708/424
2015/0286707 A1*  10/2015   Levitan ............... G06F 16/9027
                                                         707/737
        (Continued)

FOREIGN PATENT DOCUMENTS

CN        103063880 A   *   4/2013
CN        103646070 A   *   3/2014   ....... G06F 17/30277

OTHER PUBLICATIONS

Chollet, Francois, "Building Autoencoders in Keras", The Keras Blog, May 14, 2016, 15 pages.
                      (Continued)

*Primary Examiner* — Mandrita Brahmachari
(74) *Attorney, Agent, or Firm* — Hewlett Packard Enterprise Patent Department

(57)          ABSTRACT
A system and a method for updating a Machine Learning (ML) model are described The method involves capturing reconstruction errors associated with reconstruction of images by a pre-trained autoencoder. Data points representing the reconstruction errors are clustered using affinity propagation. A preference value used by the affinity propagation for determining similarity between the data points is dynamically set through linear regression. Outliers and data drifts are determined from clusters of the data points. Classification output of the ML model is associated with the outliers and the data drift, for refinement of the ML model over a device hosting a training environment.

25 Claims, 5 Drawing Sheets

(51) Int. Cl.
  *G06F 18/2321*      (2023.01)
  *G06V 10/75*       (2022.01)

(56)           References Cited

U.S. PATENT DOCUMENTS

| | | | | |
|---|---|---|---|---|
| 2018/0149855 | A1* | 5/2018 | Chou ................. | G01N 21/6458 |
| 2018/0218283 | A1* | 8/2018 | Jenson ................... | G06Q 50/01 |
| 2018/0293515 | A1* | 10/2018 | Prokopenya ............. | G09B 5/02 |
| 2020/0027211 | A1* | 1/2020 | Dufort ..................... | G06N 7/01 |
| 2020/0210782 | A1* | 7/2020 | Servajean ............. | G06F 18/295 |
| 2020/0285890 | A1* | 9/2020 | Fuchs ................. | G06V 10/762 |
| 2020/0285907 | A1* | 9/2020 | Mehr ....................... | G06N 3/04 |

OTHER PUBLICATIONS

Frey et al., "Clustering by Passing Messages Between Data Points", Science, vol. 315, Feb. 16, 2007, 5 pages.
Github, "Algorithm Overview", available online at <https://docs.seldon.io/projects/alibi-detect/en/stable/overview/algorithms.html>, 2019, 2 pages.
Kaggle, "Nih Chest X-rays", available online at <https://web.archive.org/web/20210614141431if_/https://www.kaggle.com/nih-chest-xrays/data?select=images_001, Jun. 14, 2021, 2 pages.
Kelly et al., "Key Challenges for Delivering Clinical Impact with Artificial Intelligence", BMC Medicine, 2019, 9 pages.
Vink, Ritchie, "Algorithm Breakdown: Affinity Propagation", available online at <https://www.ritchievink.com/blog/2018/05/18/algorithm-breakdown-affinity-propagation/>, May 18, 2018, 10 pages.

* cited by examiner

100

106

Outlier and Data Drift
associated with
classification output

102

104-1

104-2

104-3    104-4    104-5

104-n

MANAGING DATA DRIFT AND OUTLIERS FOR MACHINE LEARNING MODELS TRAINED FOR IMAGE CLASSIFICATION

BACKGROUND

In Artificial Intelligence (AI) environments, a data expert can use Machine Learning (ML) techniques depending on use cases, such as classification or regression, to build and fit ML models. The ML models are trained with labelled data, and followed by a validation procedure for qualifying performance to arrive at a reasonably generalized ML model. The expert evaluates several models, refines the ME models through tuning parameters, and deploys a final ML model for performing analytics on input data streams, at production environments.

As an example, edge computing is utilized as a distributed, open Information Technology (IT) architecture that features decentralized processing power, enabling, for example, mobile computing and Internet of Things (IoT) technologies. With the proliferation of computing devices at the edge, analytics of the mass data collected by these devices is possible using various methodologies, including machine learning algorithms. Because the edge devices may have a limited amount of data processing capability, only a limited amount of analytics of the mass data is performed on the edge systems. A major portion of analytics of the mass data is performed at servers that are usually present over cloud networks, due to immense data processing capability of such servers, Therefore, in most implementations, such as for IoT technologies, the training environments are set over cloud networks, and the edge systems are used as production environments.

In some applications, at the cloud servers, the analysis being performed on the gathered data can be used to train ML models. Various machine learning algorithms are used to train ML models that improve the functioning of the edge systems, as defined by certain parameters. However, in real-world applications, dynamic behaviors of systems may impact decision-making of the ML models. Dynamic behaviors may come from various sources, including sensor inefficiency, denaturing of sensors, transient changes in measured parameter, and introduction of new parameters to be analyzed. The dynamic behaviors may appear in the data as anomalies/outliers and drills. A drift can occur on input data streams or predicted output data, or a concept shift can occur in a relationship between input data. streams and outputs, over a period of time. Further, anomalies/outliers can occur because of noise or unexpected data points that influences model prediction behavior and needs deeper examination.

Outliers present in input data streams and data stream drifts could affect prediction behaviour of ML models which are pre-trained using labelled data.

BRIEF DESCRIPTION OF THE DRAWINGS

The accompanying drawings constitute a part of the description and are used to provide further understanding of the present disclosure. Such accompanying drawings illustrate the embodiments of the present disclosure which are used to describe the principles of the present disclosure. The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION OF THE INVENTION

Figure 1:
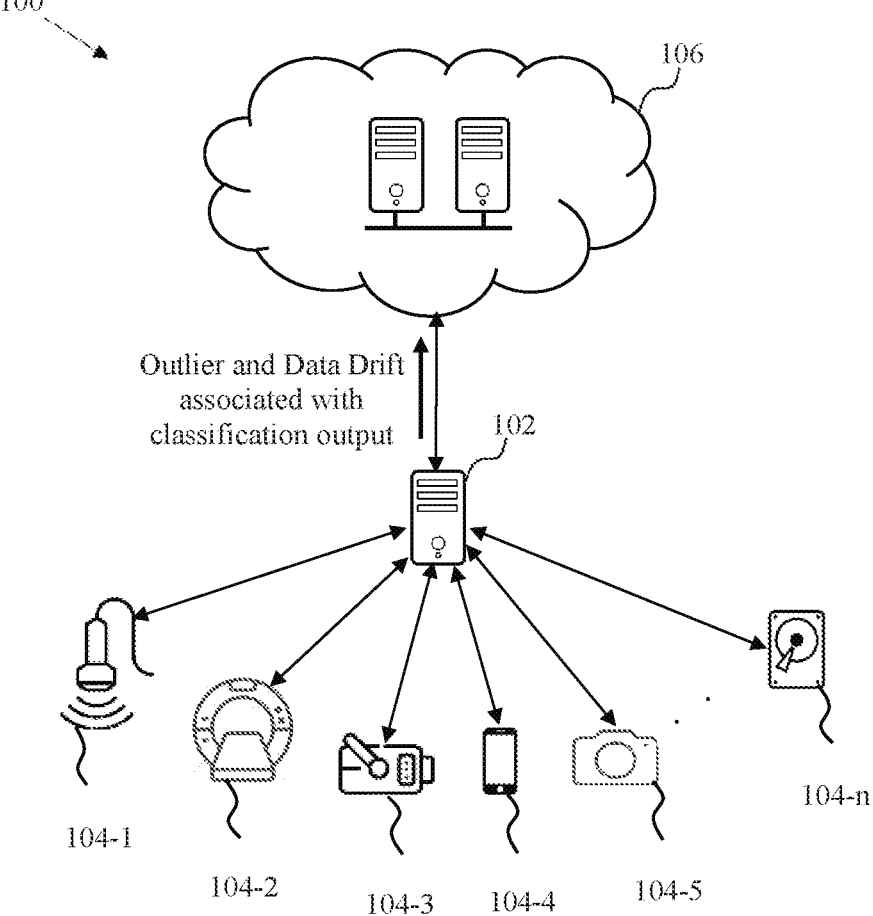
FIG. 1 illustrates a network connection diagram of a system for updating a Machine Learning (ML) model fir image classification, in accordance with an embodiment of the present disclosure.

In training environments such as the ones hosted on cloud servers, machine learning techniques such as classification or regression are used to train Machine Learning (ML) models with labelled data. Once trained, the ML models are validated to provide required performance, and then deployed on devices hosting production environments, such as edge devices, to predict events and/or values associated with the events. The predictions are utilized in forecasting, decision making, and/or other intended purposes. ML models developed using machine learning techniques are used in several technological domains, such as in healthcare domain, to understand data patterns from images. Image processing assisted with machine learning is used for several applications in healthcare domain, such as for diabetic retinopathy grading, fracture detection, cataracts, and chest diseases.

In production environments, data streams aren't typically stationery but are different from historically labelled data used for training of ML models. Because data used for training of ML models often differ from the data required to be processed by the ML models in practical environments, performance of the ML models is negatively impacted. Further, outliers and data drifts also affect performance of the ML models, wherein the events and/or values predicted by the ML models become inaccurate as compared to the actual events or actual values.

To prevent degradation of ML models due to the above said reasons, current disclosure proposes detection of data drift and outliers. Preferably, the data drift and the outliers are detected at a device hosting the production environment. The data drift and the outliers are detected by applying data processing techniques on images received at the device hosting the production environment.

At first, deep learning networks, for example, a Convolutional Neural Network, may be used for training a Machine Learning (ML) model with image training data for classification. Further, an autoencoder is trained at a device hosting a training environment i.e. a cloud server, using the image training data used to train the ML model, without any anomalies. The autoencoder is trained till it is able to reconstruct expected output with minimum losses i.e. reconstruction errors. The Autoencoder output data comprising stabilized error (loss) values after training within the watermarks is called Baseline data and is used as reference. The baseline data is used as a reference for drift analysis in a device hosting a production environment i.e. at edge devices. The baseline data can be continuously refined based on stabilized error values generated in the production environment.

Post training, the autoencoder and the ML model are deployed on the device hosting the production environment. Upon deployment, the autoencoder reconstructs images received by the device hosting the production environment. The image may be received from an image capturing device, such as a medical apparatus. During operation of the autoencoder, data losses occurring during reconstruction of the images are captured as reconstruction errors. The reconstruction errors are stored with timestamps and unique tags associated with corresponding images.

Data points representing the reconstruction errors are clustered using affinity propagation. For the clustering operation, the data points are typically supplied in batches of a predefined tunable size. Affinity propagation performs the clustering operation based on a preference value that indicates likelihood of a data point to represent a cluster of data points. An important characteristic of current disclosure includes dynamically setting the preference value by applying linear regression on the data points, so that clustering operation performs efficiently to produce an optimum number of clusters.

Upon formation of clusters of the data points using affinity propagation, outliers are determined based on one or more factors, such as maximum distance from one or more densely populated clusters, count of values of the data points, and comparison of the values with predefined watermarks in baseline data. Further, data drift is identified based on changes in densities of the clusters, over a predefined period of time. The changes in densities of the clusters are determined through histogram analysis and/or auto-correlation across cluster densities.

The ML model deployed on the device hosting the production environment classifies the received images into one or more categories. Thereupon, classification output of the ML model is associated with the outliers and the data drift to form a data package. The data package is transmitted to a device hosting a training environment where the data package is used for refinement of the ML model.

It must be understood that reference of any specific application in current disclosure, such as the medical application, is merely provided for the ease of explanation, and should not be construed as a limiting factor for application of the methodologies described herein. Therefore, it is fairly possible for a person skilled in the art to utilize the details provided in current disclosure for any similar application.

FIG. 1 illustrates a network connection diagram 100 of a system for updating a Machine Learning (ML) model. An edge device 102 is shown to be connected with image sources 104-1 to 104-n (collectively referred as an image source 104). It must be understood that within successive passes of description, the edge device 102 indicates a device hosting a production environment. For example, as illustrated in FIG. 1, the image source 104 may be a medical apparatus such as an ultrasound scanner 104-1, Computerized Tomography (CT) scan machine 104-2, and a portable X-ray machine 104-3, a handheld user device such as a smartphone 104-4, a digital camera 104-5, or a data storage device such as a Hard Disk Drive (HDD) 104-n. An ML model 220 may be trained using images received from the image source 104 or other similar images. For training the ML model 220, the images may be transmitted to a cloud server 106 connected to the edge device 102, through a communication network. It must be understood that within successive passes of description, the cloud server 106 indicates a device hosting a training environment. After the ML model 220 (explained later with reference to FIG. 2 and FIG. 5) is trained at the cloud server 106, the ML model 220 may be deployed at the edge device 102, to process new images that may be received from the image source 104.

Post deployment of the ML model 220 on the edge device 102, when the new images include varying information compared to the images used to train the ML model 220, relevant information may be extracted at the edge device 102. In an aspect, the edge device 102 may receive the new images from the image source 104. The images may be provided to an autoencoder for reconstruction. Data losses occurring during reconstruction of the images may be captured as reconstruction errors.

Data points corresponding to the reconstruction errors may be clustered using a suitable clustering technique, such as affinity propagation. Clusters of the data points may be used to determine outliers, based on one or more rules. Further, data drift may be determined by identifying changes in densities of the clusters over a predefined period of time. The ML model 220 may classify the new images provided to the edge device 102. Classification output of the ML model 220 may be associated with the outliers and the data drift, and forwarded to the cloud server 106, for refining/ updating the ML model 220.

Figure 2:
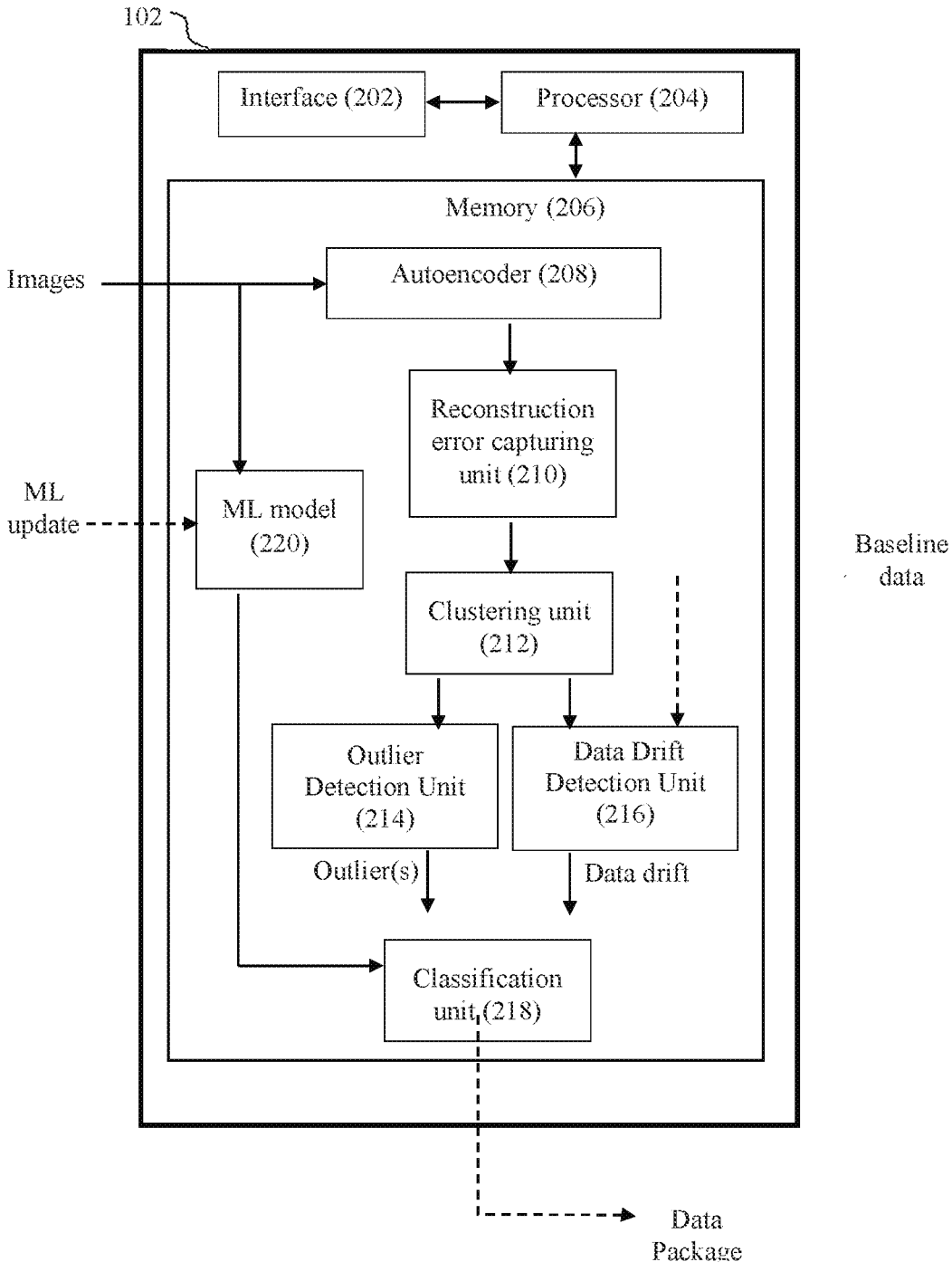
FIG. 2 illustrates a block diagram showing different components of a device for hosting a production environment for updating an ML model for image classification, in accordance with an embodiment of the present disclosure.

FIG. 2 illustrates a block diagram showing different components of the edge device 102, in accordance with an embodiment of the present disclosure. The edge device 102 may comprise an interface 202, a processor 204, and a memory 206. The memory 206 may comprise various units including an autoencoder 208, reconstruction error capturing unit 210, clustering unit 212, outlier detection unit 214, data drift detection unit 216, and a classification unit 218. All such units configured within the memory 206 are loosely coupled to provide a data processing pipeline. The units are loosely coupled means that functioning of each unit is independent with respect to functioning of remaining unit, and reconfiguration or replacement of any unit would not affect the processing or outcome of remaining units.

To update the ML model 220 deployed on the edge device 102, at first, images received from the image source 104 are provided to the autoencoder 208. It must be noted that the autoencoder 208 is trained on the cloud server 106. before being implemented on the edge device 102. Details related to training of the autoencoder 208 are provided in later section, with reference to FIG. 5.

The autoencoder 208 may be implemented using an unsupervised artificial neural network. The autoencoder 208 is pre-trained on the cloud server 106 to efficiently compress and encode image data and then reconstruct the image data back from its compressed and encoded representation. The image data is reconstructed such that it is as close as possible to the image data provided to the autoencoder 208. During the process of compression, encoding, and reconstruction, the autoencoder 208 learns to compress the image data into fewer dimensions, wherein encoded representation of the image data is present in a latent space.

While autoencoder 208 reconstructs the images received from the image source 104, the reconstruction error capturing unit 210 captures reconstruction errors i.e. losses occurring during reconstruction of each of the images, over a period of time. Therefore, each reconstruction error corresponds to loss of information in a reconstructed image compared to a corresponding original image. The reconstruction errors may be stored with timestamps and tags associated with corresponding images.

Data points corresponding to the reconstruction errors are provided to the clustering unit 212 for clustering using a suitable clustering technique. In one preferred implementation, affinity propagation may be used to cluster the data. points. The data points may be supplied in batches of a predefined tunable size, for the clustering. Therefore, the clustering technique would produce clusters of the data points supplied in batches. It must be noted that one particular advantage of using affinity propagation for clustering includes doing away with the requirement to define number of clusters to be prepared. Because cluster count can be dynamic across the batches during presence of outliers and data drift, leaving initialization of the number of clusters for affinity propagation serves the purpose.

Affinity propagation works on the principle of determining similarities between data points, and prepares clusters by maximizing total similarity between the data points and their exemplars. An exemplar is a point that represent a cluster. During the clustering, all the data points send messages to each other till convergence is achieved.

For example, processing N samples of data points $d_i$ and $d_k$ to produce a cluster ti represented as an N×N matrix) would require determining similarity (stored as a similarity matrix S(i, j)) between the data points $d_i$ and $d_k$. A diagonal of S i.e. S(i, i) would represent input preference. Such input preference, referred henceforth as preference value, indicates likelihood of a data point to become an exemplar. The preference value controls the number of clusters that would be produced through affinity propagation, and therefore, requires to be initialized. The preference value is required to be set very carefully because setting the preference value close to a minimum possible similarity would result in generation of less clusters, while setting the preference value greater than or equal to a maximum possible similarity would result in generation of numerous clusters.

In one embodiment, an optimal preference value is dynamically determined by applying linear regression on the data points. During the process, trending is performed for each batch of data points representing the reconstruction errors, to determine the preference value dynamically. A large slope identified during the trending can be indicative of a spread-out of the data points by a large distance, while a small slope can be indicative of closer set of the data points having lesser distance between them. To achieve an equilibrium, the optimal preference value is calculated dynamically between zero and a minimum similarity, from the similarity matrix S, giving a range of clusters based on distance between the data points. This would ensure an optimal cluster count with an appropriate data point density.

A detailed manner of dynamically determining the optimal preference value is now described. At first, linear regression is performed on a batch of data points, and a parameter indicating goodness of fit (r_scor) is determined. This parameter indicates whether the data points examined through linear regression are having a high affinity or a scatter. A good fit may indicate that the data points could be clustered into less number of clusters, and a bad fit may indicate that the data points could be clustered into more number of clusters. Successively, a slope (m) and a slope angle (theta) of a line fitting the ML models are determined. Then, a minimum value and a median value are extracted from the similarity set/matrix S. Post such calculations, the optimal preference value may be determined based on comparison of the goodness of fit (r_scor) with predefined threshold values. For example, in one implementation, the goodness of fit (r_scor) may be compared with a first threshold value of 0.7 and a second threshold value of 0.3. It must be understood that the threshold values 0.7 and 0.3 are practical examples, and exposed as variables for user tuning to control granularity of cluster density. In one case, when the goodness of fit (r_scor) is greater than the first threshold value i.e. r_scor>0.7, the optimal preference value may be determined as minimum value+theta*((median value−minimum value)/(90 degrees)). In another case, when the goodness of fit (r_scor) is less than or equal to the first threshold value and greater than or equal to the second threshold value i.e. r_scor<=0.7 and r_scor>=0.3, the optimal preference value may be set as the median value. In yet another case, when the goodness of fit (r_scor) is less than or equal to the second threshold value and greater than zero i.e. r_scor<=0.3 and r_scor>0, the optimal preference value may be set as half of the median value. In this manner, the optimal preference value is set dynamically through linear regression, and the clustering unit 212 efficiently and accurately clusters the data points through affinity propagation using the optimal preference value.

Clusters of the data points prepared by the clustering unit 212 are provided to the outlier detection unit 214. The outlier detection unit 214 determines outliers from the clusters, based on one or more factors including maximum distance from one or more densely populated clusters, count of values of the data points, and comparison of the values with watermarks predefined in baseline data. The baseline data indicates an output of the autoencoder 208 produced on the cloud server 106, and comprises stabilized error (loss) values obtained after the autoencoder 208 is trained within an upper water mark and a lower water mark. Watermarks indicate referential error value, and could be adjusted by a user/operator.

Figure 3A:
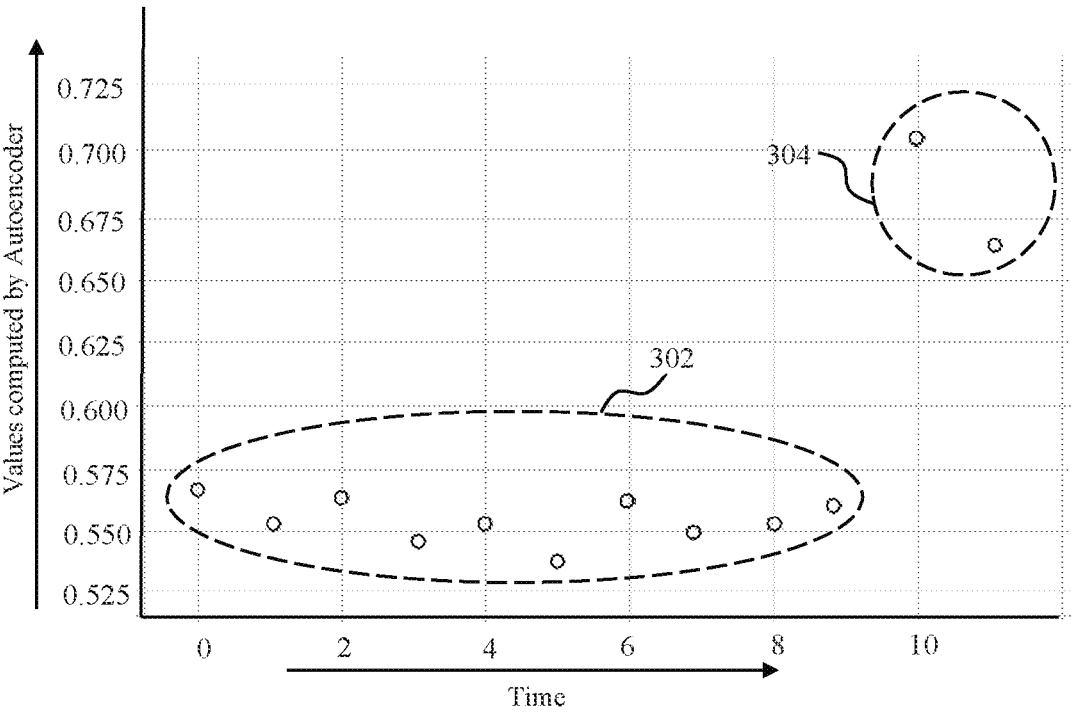
FIG. 3A illustrates clusters prepared from reconstruction errors corresponding to a first batch of images, in accordance with an embodiment of the present disclosure.
Figure 3B:
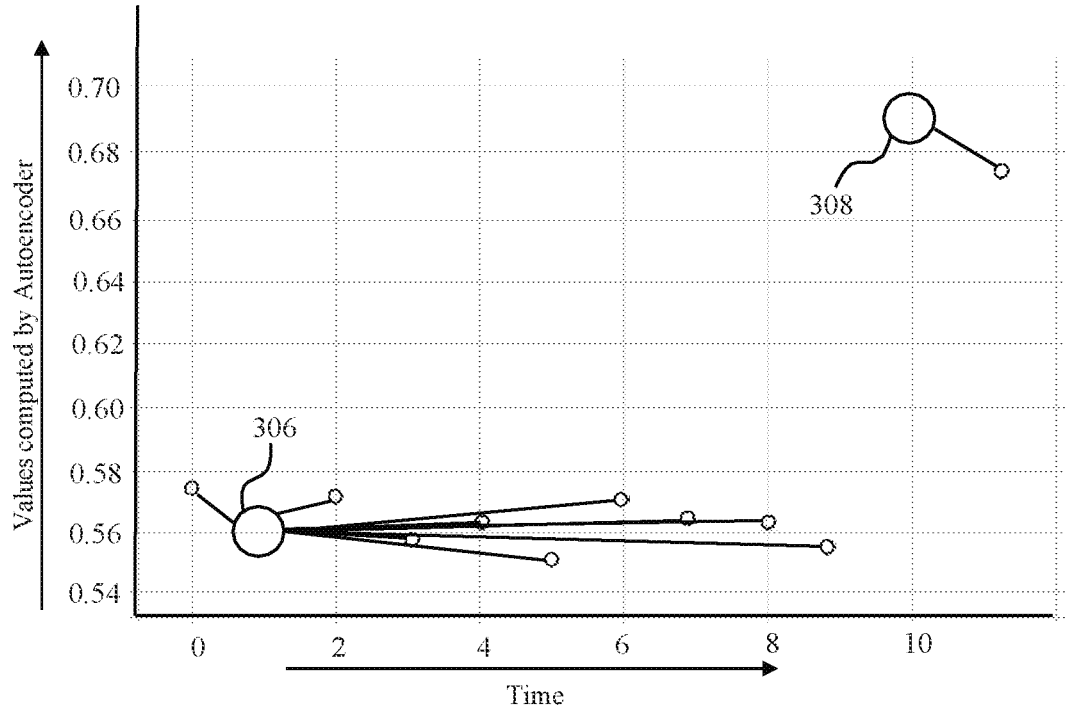
FIG. 3B illustrates a sample representation of clusters prepared for the first batch of images through affinity propagation, using an optimal preference value, in accordance with an embodiment of the present disclosure.

FIG. 3A illustrates clusters 302 and 304 prepared from reconstruction errors corresponding to a first batch of images. Cluster 302 could be seen as a densely populated cluster including several data points. Cluster 304 could be identified as an outlier cluster for being present far from the densely populated cluster i.e. cluster 302. FIG. 3B illustrates a sample representation of clusters prepared through affinity propagation, using the optimal preference value. All the data points in a first cluster could be seen to be linked with exemplar 306. Similarly, in a second cluster, a single data point could be seen connected with exemplar 308.

In one embodiment, the data drift detection unit 216 detects data drift by assessing densities of the clusters in a temporal manner. A change in density of cluster with reference to the baseline data, for a period of time, is indicative of data drift i.e. deviation in data pattern. The change in density of each cluster is determined using auto-correlation, such as Pearson's correlation.

Figure 4A:
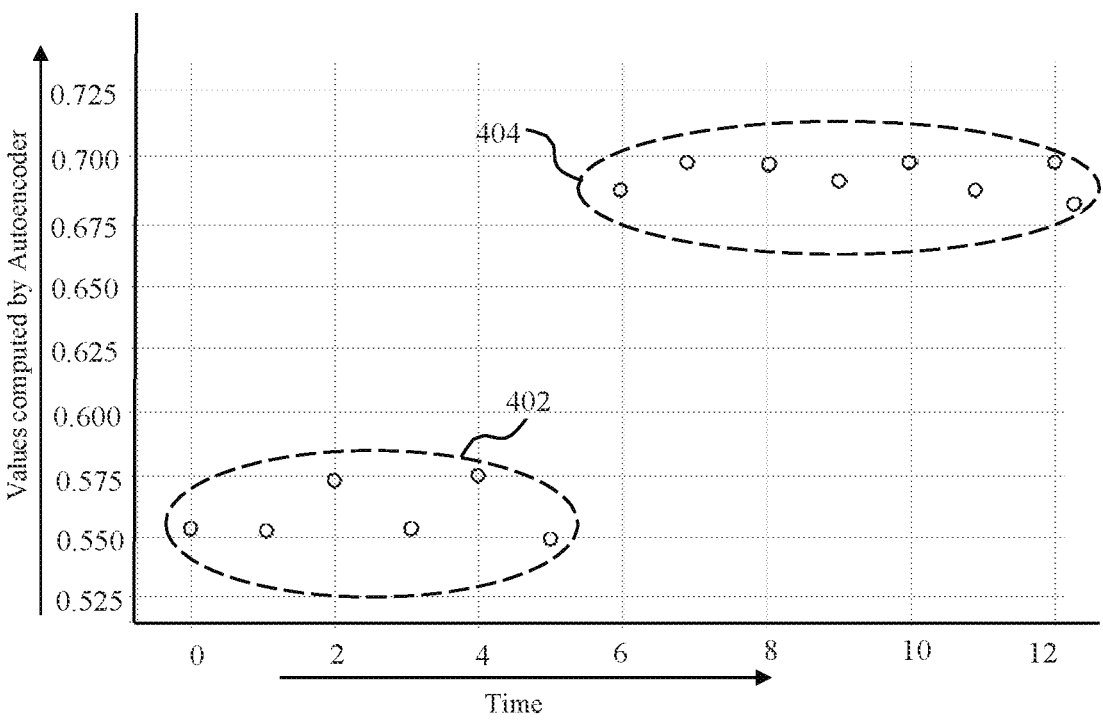
FIG. 4A illustrates clusters prepared from reconstruction errors corresponding to a second hatch of images, in accordance with an embodiment of the present disclosure.
Figure 4B:
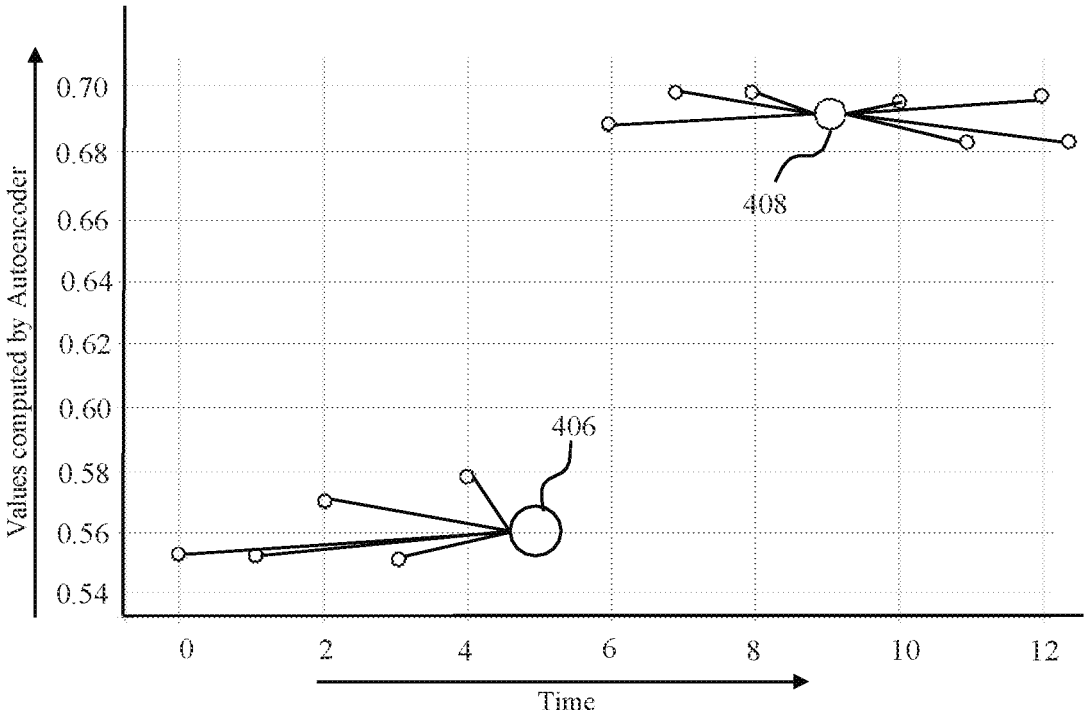
FIG. 4B illustrates a sample representation of clusters prepared for the second batch of images through affinity propagation, using an optimal preference value, in accordance with an embodiment of the present disclosure.

FIG. 4A illustrates clusters 402 and 404 prepared from reconstruction errors corresponding to a second batch of images. Comparing the clusters 402 and 404 with the clusters 302 and 304, change in cluster densities indicating the data drift could be easily observed. FIG. 4B illustrates a sample representation of clusters prepared through affinity propagation, using the optimal preference value. All the data points in a first cluster could be seen to be linked with exemplar 406. Similarly, in a second cluster, data points could be seen to be connected with exemplar 408.

A detailed process of determining data drift is now described. All the steps mentioned henceforth are performed for each of the clusters created by the clustering unit 212. At first, density distribution of the data points within each of the clusters is derived using histogram analysis. Output of histogram analysis for each of the clusters is saved in a density set. Thereupon, auto-correlation is run across every two density sets and the baseline data created in a temporal manner. While performing the auto-correlation, if histogram counts of two density sets are different, imputation with '0' value is inserted into a density set having a lower count. Output obtained through auto-correlation is analysed with reference to set threshold values, to determine the data drift. For example, a strong correlation greater than a threshold value would indicate a consistent density pattern. Alternatively, a weak positive correlation lesser than the threshold value would indicate a change in the density pattern. Further, a negative correlation would indicate a data pattern exhibiting significant drift in the density pattern. Finally, data drift may be identified in case the output obtained through auto-correlation is found to be monotonically decreasing, over a predefined time period.

In one embodiment, the images provided to the autoencoder 208 are also provided to the ML model 220. The ML model 220 classifies the images into one or more categories. Such classification output provided by the ML model 220 is provided to the classification unit 218. The classification unit 218 associates the classification output provided by the ML model 220 with the outliers detected by the outlier detection unit 214 and the data drift detected by the data drift detection unit 216, to form a data package. The data package may include segregated information present in at least three categories i.e. the outliers/anomalies, data drift in classified images, and data drift in unclassified images. The data package may be transmitted to the cloud server 106 for determining requirement to update the ML model 220 and accordingly update the ML model 220.

Figure 5:
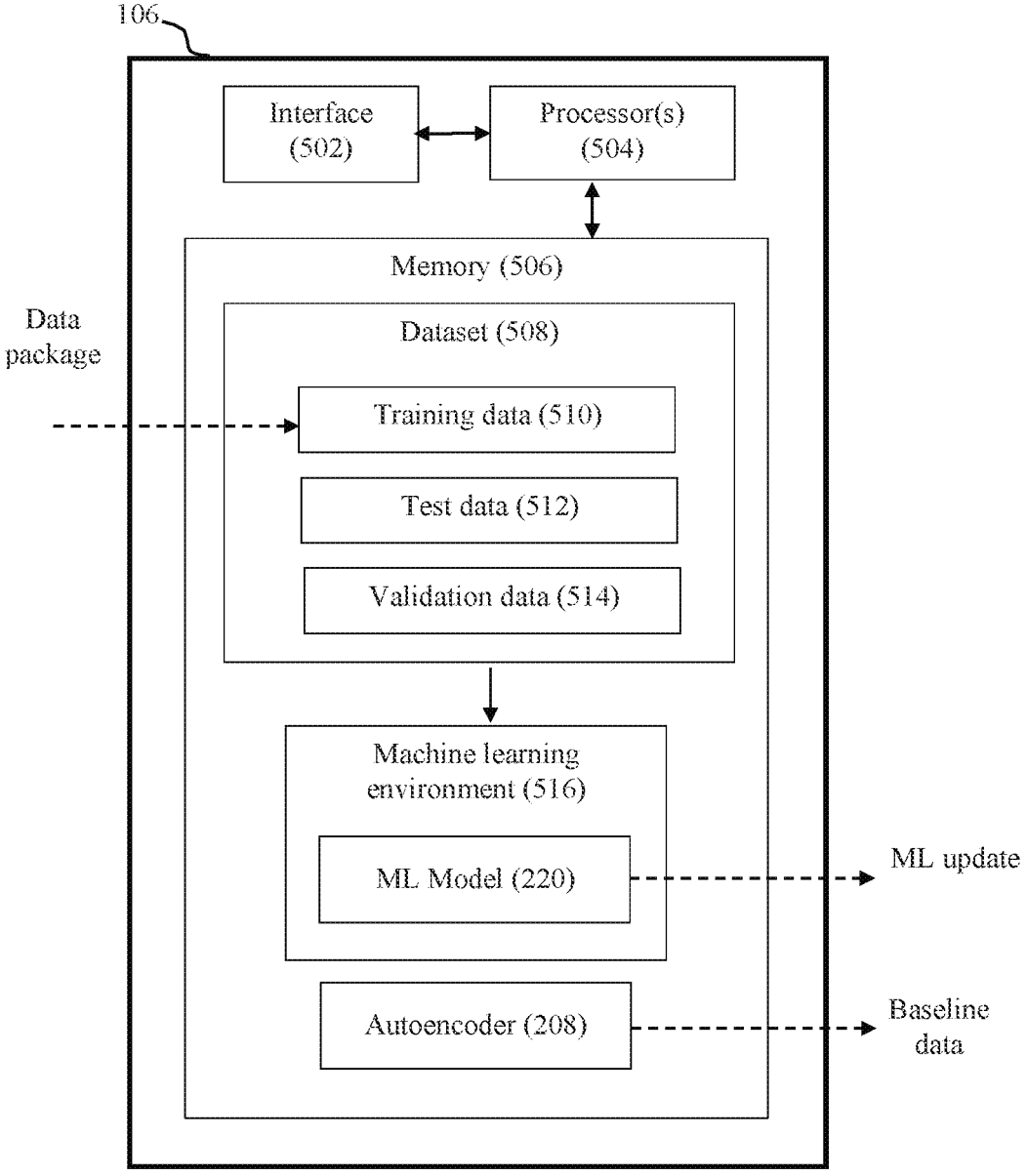
FIG. 5 illustrates a block diagram of a cloud server for updating an ML model for image classification, in accordance with an embodiment of the present disclosure.

FIG. 5 illustrates a block diagram of the cloud server 106 for training and updating the ML model 220, in accordance with an embodiment of the present disclosure. As illustrated, the cloud server 106 may comprise an interface 502, processor(s) 504, and a memory 506. The memory 506 may include dataset 508 required for training the ML model 220, before being deployed on the edge device 102. The dataset 508 includes training data 510, test data 512, and validation data 514. Using all such data i.e. the training data 510, the test data 512, and the validation data 514, the ML model 220 is trained in a machine learning environment 516.

At the cloud server 106, the ML model 220 may be trained using the images received from the image source 104 or other similar images. For example, if the ML model 220 is required to detect pneumonia by processing X-ray images of chest region of patients, the ML model 220 will be trained using X-ray images of patients that are known to be affected with pneumonia. In one implementation, deep learning networks, for example, Convolutional Neural Networks (CNNs), may be used for training the ML model 220. Once trained, the ML model 220 is deployed on the edge device 102.

After deployment of the ML model 220 on the edge device 102, the data package is received at the cloud server 106, as described above. The data package includes classification output of the ML model 220 associated with the outliers and the data drift. The data package is used to supplement the training data 510 using which the ML model

220 may be refined/updated. The data package may be assessed to determine if the data package comprises any essential information using which the ML model 220 is required to be updated or the data package includes unessential information that needs to be discarded. For example, some information present in the data package exists sporadically, it could be identified as a noise or an error introduced by a sensor capturing images, and thus may be discarded. On the other hand, some other information present in the data package exists prominently, it could be identified as useful information using which the ML model 220 may need to be updated.

In one implementation, weights of the ML model 220 may be adjusted based on the information present in the data package, for updating the ML model 220. After being updated, ML model update or updated ML model may be transmitted to the edge device 102 for deployment.

The memory 506 also includes the autoencoder 208 that is trained using the training data 510. Initially, before being deployed on the edge device 102, the autoencoder 208 is trained till it is able to reconstruct expected output (images) with minimum reconstruction errors. The reconstruction errors indicate loss values, and are determined as Mean Squad Error (MSE) output for the images re-constructed by the autoencoder 208. Further, the minimum reconstruction errors correspond to a range of values present between an upper water mark and a lower water mark, tunable based on quality of reconstruction of the images. The baseline data is used as a reference for identifying data drift at the edge device 102. The autoencoder 208 and the baseline data are both updated on the cloud server 106, using the data package received from the edge device 102.

Accordingly, the above described system and method provide determining outliers and data drift at edge system using affinity clustering configured to determine optimum number of data clusters, associating classification output of an ML model with the outliers and the data drift, and communicating the associated information to a cloud server, for updating the ML model. Communicating only the associated information to the cloud server allows saving of time, bandwidth, and computing power required for updating ML models. The ML models updated using the data drift and the outliers associated with the classification output of an ML model would predict accurate outputs that could be used for decision making at an edge device.

A method of updating an ML model is now described. At first, a plurality of images is provided to an autoencoder and an ML model, each pre-trained on similar training data, over a server. The autoencoder is pre-trained over the server till it is able to reconstruct images with error values present within predefined tunable thresholds. Once implemented on an edge device, the autoencoder reconstructs the plurality of images, and the ML model classifies the plurality of images into one or more categories.

Reconstruction errors occuring during reconstruction of the plurality of images are captured for further processing. The reconstruction errors may be stored with timestamps and tags associated with corresponding images. Data points representing the reconstruction errors may be supplied in batches of a predefined tunable size for clustering. The data points are clustered using affinity propagation. A preference value used by the affinity propagation for determining similarity between the data points is dynamically set by applying linear regression on the data points. The preference value indicates likelihood of a data point to represent a cluster of data points, and is dynamically set by performing trending of values of the reconstruction errors through linear regression. The preference value is dynamically set between zero and a minimum similarity obtained from the similarity matrix S.

Outliers are determined from clusters of the data points based on one or more factors including maximum distance from one or more densely populated clusters, count of values of the data points, and comparison of the values with predefined watermarks in baseline data. The baseline data corresponds to an output of the autoencoder trained at a cloud server, and comprises stabilized reconstruction error values.

Presence of data drift is determined based on changes in densities of the clusters, over a predefined period of time. The changes in densities of the clusters are determined through histogram analysis and/or auto-correlation across cluster densities. Thereupon, classification output of the ML model is associated with the outliers and the data drift to produce a data package that could be used for refinement of the ML model.

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the above description, for purposes of explanation, numerous specific details are set forth in order to provide a thorough understanding of the present systems and methods. It will be apparent the systems and methods may be practiced without these specific details. Reference in the specification to "an example" or similar language means that a particular feature, structure, or characteristic described in connection with that example is included as described, but may not be included in other examples.

As used in the present specification, the term "machine learning" refers broadly to an artificial intelligence technique in which a computer's behaviour evolves based on empirical data. In some cases, input empirical data may come from databases and yield patterns or predictions thought to be features of the mechanism that generated the data. Further, a major focus of machine learning is the design of algorithms that recognize complex patterns and makes intelligent decisions based on input data. Machine learning may incorporate a number of methods and techniques such as; supervised learning, unsupervised learning, reinforcement learning, multivariate analysis, case-based reasoning, backpropagation, and transduction.

In the above description and figures, some example and/or implementations of systems and/or methods for updating an ML model are described. As used herein, cloud server may be employed to provide a service, such as data processing, data communication, data storage, or any other product or activity that may be capable of running on the cloud server, or a cloud-based service. As used herein, the cloud server may be any appropriate combination of physical and virtual resources pooled for computing and/or storage purposes. For example, the cloud server may include any appropriate number of individual resources, servers, and server groups including virtual instances of resources, servers, and server groups. The cloud server may include any appropriate number of clouds and/or other network of resources accessible by the edge device.

Edge device may correspond to a device capable of processing images received from data sources such as mobile devices, desktops, laptops, tablets, internet of things (IoT) devices, medical equipment, robots, etc. The edge device may execute applications that include artificial intelligence/Machine Learning (ML) models. In some implementations, the edge device may process images using trained ML model, for generation of prediction data, confidence scores, and/or performance scores.

Implementations described hereinabove provide a system for ML model management, ML model deployment, ML model feedback collection, ML model re-training, etc. in support of applications executable on the edge device. ML models may be selected and deployed based on characteristics shared between the edge device and other edge systems, and/or the cloud server. Information received from the edge device may be used to update/re-train instances of ML models, and the ML models may be tracked, documented, and stored such that ML models may be specifically managed and customized for a single edge device, a group of edge device, etc. ML models are continuously or periodically monitored for accuracy, updated based on information, and deployed on various edge device.

A computer network providing communication between the edge device and the cloud server may be implemented using wired and/or wireless communication technologies. The computer network may comprise various network components such as switches, Provide Edge (PE) routers, Customer Edge (CE) routers, intermediate routers, bridges, computers, servers, and the like. The network devices present in the computer network may implement an Interior Gateway Protocol (IGP) including, but not limited to, Open Shortest Path First (OSPF), Routing Information Protocol (RIP), Intermediate System to Intermediate System (IS-IS), and Enhanced Interior Gateway Routing Protocol (EIGRP).

An interface may be used to provide input or fetch output from the system. The interface may be implemented as a Command Line Interface (CLI), Graphical User Interface (GUI). Further, Application Programming Interfaces (APIs) may also be used for remotely interacting with edge devices and cloud servers.

A processor may include one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor), MIPS/ARM-class processor, a microprocessor, a digital signal processor, an application specific integrated circuit, a microcontroller, a state machine, or any type of programmable logic array.

A memory may include, but is no limited to, non-transitory machine-readable storage devices such as hard drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set as claimed in claims that issue from this application, in the specific form in which such claims issue, including any subsequent correction.

We claim:

1. A method comprising:

providing, at a device hosting a production environment, a plurality of digital images to an autoencoder and a Machine Learning (ML) model, wherein the plurality of digital images correspond to one or more types of hardware digital image source devices, wherein the autoencoder and ML model are pre-trained in a cloud server training environment on image training data, and wherein the autoencoder reconstructs the plurality of digital images and the ML model classifies the plurality of digital images into one or more categories;

capturing reconstruction errors that occur during reconstruction of the plurality of digital images, wherein the reconstruction errors correspond to losses of information in a reconstructed image compared to a corresponding original image that occur during reconstruction of the plurality of digital images by the autoencoder;

clustering data points representing the reconstruction errors using an affinity propagation algorithm that allows for a dynamic determination of a quantity of clusters of the data points that result from the clustering;

determining outliers from the clusters of the data points based on one or more of maximum distance from one or more densely populated clusters, count of values of the data points, and comparison of the values with predefined watermarks in baseline data;

determining data drift based on changes in densities of the clusters, over a predefined period of time;

associating classification output of the ML model with the outliers and the data drift, thereby producing a data package;

providing the data package to a training environment for updating the ML model with the classification output associated with the outliers and the data drift, adjusting weights of the ML model based on the data package, and updating the autoencoder and the baseline data; and causing an updated ML model that has been updated using the data package to determine a classification category of a new digital image corresponding to the one or more types of digital image source devices.

2. The method of claim 1, wherein the autoencoder and the ML model are pre-trained on a device hosting a training environment.

3. The method as claimed in claim 1, wherein the autoencoder is pre-trained so that the autoencoder is able to reconstruct images with error values present within predefined tunable thresholds.

4. The method of claim 1, wherein the data points representing the reconstruction errors are supplied in batches of a predefined tunable size for the clustering.

5. The method of claim 1, wherein the reconstruction errors are stored with timestamps and tags associated with corresponding images.

6. The method of claim 1, wherein a preference value used by the affinity propagation for determining similarity between the data points is dynamically set by applying linear regression on the data points.

7. The method of claim 6, wherein the preference value indicates likelihood of a data point to represent a cluster of data points.

8. The method of claim 6, wherein the preference value is dynamically set by performing trending of values of the reconstruction errors through the linear regression.

9. The method of claim 6, wherein the preference value is dynamically set between zero and a minimum similarity obtained from a similarity matrix.

10. The method of claim 1, wherein the baseline data corresponds to an output of the autoencoder trained at a device hosting a training environment, and comprises stabilized reconstruction error values.

11. The method of claim 1, wherein the changes in densities of the clusters are determined through histogram analysis and auto-correlation across cluster densities.

12. A device hosting a production environment, comprising:

a processor; and a memory coupled with the processor, the memory storing programmed instructions, which when executed by the processor, causes the processor to:

provide a plurality of digital images to an autoencoder and a Machine Learning (ML) model, wherein the plurality of digital images correspond to one or more types of hardware digital image source devices, wherein the autoencoder and ML model are pre-trained on image training data, wherein the autoencoder reconstructs the plurality of digital images and the ML model classifies the plurality of digital images into one or more categories;

capture reconstruction errors that occur during reconstruction of the plurality of digital images, wherein the reconstruction errors correspond to losses of information in a reconstructed image compared to a corresponding original image that occur during reconstruction of the plurality of digital images by the autoencoder;

cluster data points representing the reconstruction errors using an affinity propagation algorithm that allows for a dynamic determination of a quantity of clusters of the data points that result from the clustering;

determine outliers from the clusters of the data points based on one or more of maximum distance from one or more densely populated clusters, count of values of the data points, and comparison of the values with predefined watermarks in baseline data;

determine data drift based on changes in densities of the clusters, over a predefined period of time;

associate classification output of the ML model with the outliers and the data drift, thereby producing a data package;

provide the data package to a training environment where the data package is used to update the ML model with the classification output associated with the outliers and the data drift, adjust weights of the ML model based on the data package, and update the autoencoder and the baseline data; and cause an updated ML model that has been updated using the data package to determine a classification category of a new digital image corresponding to the one or more types of digital image source devices.

13. The device of claim 12, wherein the autoencoder and the ML model are pre-trained on a device hosting a training environment.

14. The device of claim 12, wherein the autoencoder is pre-trained so that the autoencoder is able to reconstruct images with error values present within predefined tunable thresholds.

15. The device of claim 12, wherein the data points representing the reconstruction errors are supplied in batches of predefined tunable size for the clustering.

16. The device of claim 12, wherein the reconstruction errors are stored with timestamps and tags associated with corresponding image data.

17. The device of claim 12, wherein a preference value used by the affinity propagation for determining similarity between the data points is dynamically set by applying linear regression on the data points.

18. The device of claim 17, wherein the preference value indicates likelihood of a data point to represent a cluster of data points.

19. The device of claim 17, wherein the preference value is dynamically set by performing trending of values of the reconstruction errors through the linear regression.

20. The device of claim 17, wherein the preference value is dynamically set between zero and a minimum similarity obtained from a similarity matrix.

21. The device of claim 12, wherein the baseline data corresponds to an output of the autoencoder trained at a device hosting a training environment, and comprises stabilized reconstruction error values.

22. The device of claim 12, wherein the changes in densities of the clusters are determined through histogram analysis and auto-correlation across cluster densities.

23. A device hosting a training environment, comprising:
one or more processors; and one or more memories coupled with the one or more processors, the one or more memories storing programmed instructions, which when executed by the one or more processors, causes the one or more processors to:

train a Machine Learning (ML) model upon a plurality of digital images that correspond to one or more types of hardware digital image source devices;

receive, from a device hosting a production environment and executing the ML model, a data package that includes classification output of the ML model associated with outliers and data drift,
wherein:

the data drift is based on changes in densities of clusters over a pre-determined period of time, the clusters are generated via clustering using data points representing reconstruction errors that occur during reconstruction of the plurality of images, the clustering allowing for a dynamic determination of a quantity of clusters of the data points, and the reconstruction errors correspond to losses of information in a reconstructed image compared to a corresponding original image that occur during reconstruction of the plurality of images by an autoencoder;

generate an updated ML model by updating the ML model using the classification output of the ML model associated with the outliers and the data drift, including updating weights of the ML model based on the classification output; and cause the updated ML model to determine a classification category of a new digital image corresponding to the one or more types of digital image source devices.

24. The device of claim 23, further comprising training an autoencoder the plurality of images to produce baseline data comprising stabilized reconstruction error values.

25. The device of claim 24, wherein the autoencoder is trained so that the autoencoder is able to reconstruct images with error values present within predefined tunable thresholds.

* * * * *